United States Patent
Dettinger et al.

(10) Patent No.: US 7,051,020 B2
(45) Date of Patent: May 23, 2006

(54) INTELLIGENT QUERY RE-EXECUTION

(75) Inventors: Richard D. Dettinger, Rochester, MN (US); Richard J. Stevens, Mantorville, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 10/184,429

(22) Filed: Jun. 27, 2002

(65) Prior Publication Data

US 2004/0002961 A1      Jan. 1, 2004

(51) Int. Cl.
G06F 17/30    (2006.01)
G06F 7/00     (2006.01)

(52) U.S. Cl. .............. 707/4; 707/2; 707/200; 707/10

(58) Field of Classification Search ............ 707/3, 707/1, 2, 4, 200, 10; 703/2
See application file for complete search history.

(56) References Cited

U.S. PATENT DOCUMENTS

| | | | |
|---|---|---|---|
| 5,495,600 A * | 2/1996 | Terry et al. | 707/3 |
| 6,003,039 A | 12/1999 | Barry et al. | |
| 6,014,656 A * | 1/2000 | Hallmark et al. | 707/2 |
| 6,341,281 B1 * | 1/2002 | MacNicol et al. | 707/3 |
| 6,363,371 B1 | 3/2002 | Chaudhuri et al. | |
| 6,439,783 B1 * | 8/2002 | Antoshenkov | 707/3 |
| 6,493,701 B1 * | 12/2002 | Ponnekanti | 707/2 |
| 6,584,477 B1 * | 6/2003 | Mosher, Jr. | 707/204 |
| 6,636,845 B1 * | 10/2003 | Chau et al. | 707/1 |
| 6,694,306 B1 * | 2/2004 | Nishizawa et al. | 707/3 |
| 6,725,227 B1 | 4/2004 | Li | |
| 6,792,399 B1 * | 9/2004 | Phillips et al. | 705/36 R |

* cited by examiner

Primary Examiner—Jean R. Homere
Assistant Examiner—Kuen S. Lu
(74) Attorney, Agent, or Firm—Patterson & Sheridan, LLP (57) ABSTRACT

A method, apparatus and article of manufacture for accessing data in a database. One embodiment comprises providing a query against the database, the query being associated with a re-execution indication; initially executing the query; providing an initial query result; determining at least one re-execution time from the re-execution indication; and re-executing the query at the at least one determined re-execution time.

40 Claims, 9 Drawing Sheets

INTELLIGENT QUERY RE-EXECUTION

BACKGROUND OF THE INVENTION

1. Field of the Invention

The present invention generally relates to data processing and, more particularly, to re-executing a query against a database for updating results of an initial query execution.

2. Description of the Related Art

Computerized information storage and retrieval systems made up of a (possibly large) number of files or tables are available in form of databases. The most prevalent type of database is the relational database, a tabular database in which data is defined so that it can be reorganized and accessed in a number of different ways.

Storing and retrieving data in a database or data warehouse is performed by means of a computer database management system (DBMS). A relational database management system (RDBMS) is a DBMS that uses relational techniques for storing and retrieving data. Regardless of the particular architecture, in a DBMS, a requesting entity (e.g., an application, the operating system or a user) demands access to a specified database or data warehouse by issuing a database access request. Such requests may include, for instance, simple catalog lookup requests or transactions and combinations of transactions that operate to read, change and add specified records in the database. These requests are made using high-level query languages such as the Structured Query Language (SQL).

Illustratively, SQL is used to make interactive queries for getting information from and updating a database such as International Business Machines' (IBM®) DB2®, Microsoft's SQL Server®, and database products from Oracle®, Sybase®, and Computer Associates®. The term "query" denominates a set of commands for retrieving and processing data from a stored database. Queries take the form of a command language that lets programmers and programs select, insert, update, find out the location of data, and so forth.

Assume a database including a table "DEMOGRAPHIC" having a plurality of data records, each data record comprising at least an indication of a last name, gender and age of a specific person. Assume further that a user wants to retrieve the last names of all male persons over the age of 40 from this table. To this end, the user would issue the following query against the database:

"select last_name from DEMOGRAPHIC where age>40 and gender=male".

This query includes three parts separated from each other using keywords. The first part includes the keyword "select" and designates the data to be extracted from retrieved data records, i.e., the "last_name". The second part includes the keyword "from" and designates the table of the database to be selected for retrieving data, i.e., the table "DEMOGRAPHIC". The third part includes the keyword "where" and comprises conditions defining properties of the data records to be retrieved, i.e., only data records relating to persons having an age ">40" and the gender "male".

One aspect of database environments, which complicates successful queries is that changes are continuously being made to the underlying data. Consequently, the result set of a given executed query may be different depending on when the query is executed. It would be desirable to ensure that, over time, new data that satisfies the query is also made available to the user who initially executed the query.

Assume a medical facility interested in conducting a specific research study. A plurality of groups within the medical facility may be involved in the specific research study to collect samples and other information to be used in the study. Typically, a coordinator of the specific research study sets up the study. To set up the study, the coordinator must coordinate the plurality of groups within the medical facility. Setting up the study further comprises finding a group of candidates that meet the criteria set forth by the study. This may involve complex queries against databases or data warehouses, which can be very expensive to run, as hours to days of execution time may be required to collect an initial list of possible candidates. Once this list is built, the coordinator must coordinate getting agreement from the possible candidates to participate in the study. This can be a long and difficult process extending over months for a number of reasons. For instance, due to laws protecting privacy simply calling possible candidates via telephone may be prohibited. Moreover, each possible candidate may not accept participation in the research study. In the event the coordinator can not gather sufficient candidates from the initially determined possible candidates for the specific research study, he is required to re-execute the queries against databases or data warehouses. Then the coordinator would need to identify new possible candidates from the newly produced search result.

However, re-executing complex queries and determining if any differences from an initial search result occur is generally problematic because of the huge amount of processing time required for the re-execution and the following identification of new relevant data records. Accordingly, there is a need for a more efficient and effective technique for re-executing a query against a database or a data warehouse.

SUMMARY OF THE INVENTION

The present invention generally relates to data processing and, more particularly, to re-executing a query against a database for efficiently and effectively updating results of at least one previous execution of the query.

One embodiment of the present invention relates to a computer-readable medium containing a program which, when executed on a computer system, performs an operation of accessing data in a database. The operation comprises: receiving a query against the database, the query being associated with a re-execution indication; initially executing the query; providing an initial query result; determining at least one re-execution time from the re-execution indication; and re-executing the query at the at least one determined re-execution time.

Another embodiment of the present invention relates to a computer-readable medium containing a program which, when executed on a computer system, performs an operation of accessing data in a database. The operation comprises: receiving an initial query against the database, the initial query comprising a first and a second condition; executing the initial query; providing an initial query result comprising at least one first data record satisfying the initial query; generating a first query using the first condition and a second query using the second condition; and executing the first and second queries to determine whether the database comprises at least one second data record satisfying the initial query.

Another embodiment of the present invention relates to a computer-readable medium containing a program which, when executed on a computer system, performs an operation of accessing data in a database. The operation comprises: receiving an initial query against the database, the initial query comprising a first and a second condition and being associated with a re-execution indication; executing the initial query; providing an initial query result comprising at least one first data record satisfying the initial query; generating a first query using the first condition and a second query using the second condition; determining at least one re-execution time from the re-execution indication; and executing the first and second queries at the at least one determined re-execution time to determine whether the database comprises at least one second data record satisfying the initial query.

Another embodiment of the present invention relates to a method of accessing data in a database. The method comprises: providing a query against the database, the query being associated with a re-execution indication; initially executing the query; providing an initial query result; determining at least one re-execution time from the re-execution indication; and re-executing the query at the at least one determined re-execution time.

Another embodiment of the present invention relates to a method of accessing data in a database. The method comprises: providing an initial query against the database, the initial query comprising a first and a second condition; executing the initial query; providing an initial query result comprising at least one first data record satisfying the initial query; generating a first query using the first condition and a second query using the second condition; and executing the first and second queries to determine whether the database comprises at least one second data record satisfying the initial query.

Another embodiment of the present invention relates to a method of accessing data in a database. The method comprises: providing an initial query against the database, the initial query comprising a first and a second condition and being associated with a re-execution indication; executing the initial query; providing an initial query result comprising at least one first data record satisfying the initial query; generating a first query using the first condition and a second query using the second condition; determining at least one re-execution time from the re-execution indication; and executing the first and second queries at the at least one determined re-execution time to determine whether the database comprises at least one second data record satisfying the initial query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides a method, a data structure, a computer program product and a computer for data processing and, more particularly, to re-executing a query against a database for efficiently and effectively updating results of the query.

Data from different databases may be correlated and stored in the form of data warehouses. One embodiment is implemented in a data warehouse. A recent trend is building data warehouses with real-time data. In some cases, such data warehouses consist of some or all of the data being replicated to the data warehouse rather than being extracted via more traditional extract-transform-load processes. In the extract-transform-load processes, extracted data is typically entirely copied, i.e., converted/transformed and processed during the extract process according to the requirements of a corresponding data warehouse and has some freedom to change values as long as some method to map the data back to the original data source exists to allow incremental updates. In contrast, replicating data represents moving data from an original data source to the data warehouse, wherein only changes are copied, but not the whole data. Accordingly, replicated data is merely copied without transformation.

In the following description, the term "replicating" is used to designate a real-time copying process of a portion of data, which has been changed, wherein the portion of data is automatically copied when the change occurs. The term "extracting" is used to designate an automated periodical copying process of the entire data at pre-determined time intervals. However, it should be appreciated that both, the described "replicating" and "extracting" processes are interchangeable in the described embodiments and that any modifications to the described "replicating" and "extracting" processes are also contemplated. For instance, "replicating" may comprise copying the entire data when the change occurs and "extracting" may be performed at any desired time and/or may be initiated manually by a user. Furthermore, it should be noted that the terms "identifier" and "key" are interchangeably used in the following description and additionally, where reference is made to a table, the terms "data record" and "row" are used interchangeably.

One embodiment of the invention is implemented as a program product for use with a computer system such as, for example, the computing environment 100 shown in FIGS. 1–3 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
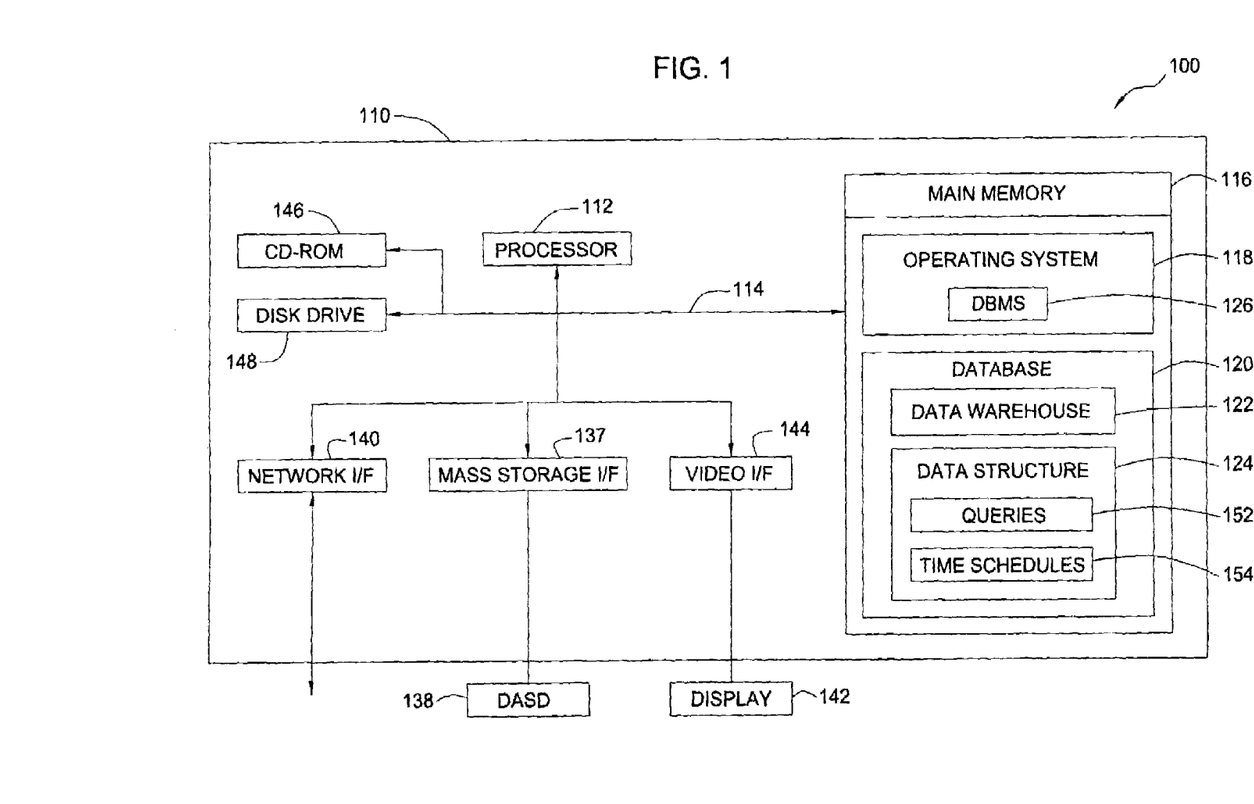
FIGS. 1–3 are high level diagrams of a computing environment according to an aspect of the present invention.

Referring now to FIG. 1, a computing environment 100 comprising an illustrative computer system 110 according to one aspect of the present invention is shown. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, data structure, computer program product and computer-readable mediums of the invention. Illustratively, the computer system 110 is part of a networked system; however, in other embodiments, the computer system 110 is a standalone device. Accordingly, the invention may be practiced in a distributed computing environment in which tasks are performed by remote processing devices that are linked through a communications network. In a distributed computing environment, program modules may be located in both local and remote memory storage devices.

In any case, it is understood that FIG. 1 is merely one configuration for a computing environment and computer system. Embodiments of the invention can apply to any comparable configuration, regardless of whether the computer system 110 is a complicated multi-user apparatus, a single-user workstation, or a network appliance that does not have non-volatile storage of its own.

The computer system 110 could include a number of operators and peripheral systems as shown, for example, by a mass storage interface 137 operably connected to a direct access storage device 138, and by a video interface 144 operably connected to a display 142. The display 142 may be any video output device for outputting viewable information. The computer system 110 could further include a number of storage media drives such as a CD-ROM drive 146 and a diskette drive 148 suitable to read out information permanently stored on non-writable storage media (e.g., read-only memory devices within a computer such as CD-ROM disks readable by CD-ROM drive 146) or alterable information stored on writable storage media (e.g., floppy disks readable by diskette drive 148). CD-ROM drive 146 and diskette drive 148 are illustrated as forming an integral part of computer system 110. It should, however, be appreciated that either CD-ROM drive 146 or diskette drive 148, or both of them, may be provided as peripheral devices that are operably connected to the computer system 110.

Computer system 110 may further comprise any type of suitable input means (not shown) to give input to the computer system 100. For example, a keyboard, keypad, light pen, touch screen, button, mouse, track ball, or speech recognition unit could be used. Further, this input means and display 142 could be combined. For example, a display screen with an integrated touch screen, a display with an integrated keyboard or a speech recognition unit combined with a text speech converter could be used.

Computer System 110 is shown comprising at least one processor 112, which obtains instructions, or operation codes, (also known as opcodes), and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in computing environment 100, for example, any storage capacity used as virtual memory or stored on a mass storage device (e.g., direct access storage device 138) or on another computer coupled to the computer system 110.

As shown, the main memory 116 includes an operating system 118. The operating system 118 may be any suitable operating system capable of supporting the functions of the present invention. An exemplary operating system, which may be used to advantage, is Linux. The operating system 118 may include a database management system (DBMS) 126, which may be implemented as a relational database management system (RDBMS). Alternatively, the DBMS 126 may be a separate application stored in main memory 116 or any other storage.

The DBMS 126 is used for managing a database 120 and, in particular, for storing and retrieving data in the database 120. Alternatively, the DBMS is used for storing and retrieving data in a data warehouse 122 of the database 120. The database 120 may be included in main memory 116 for storing any type of information and, in particular, data warehouse 122 and a data structure 124. The data warehouse 122 comprises data of one or more data sources. The data structure 124 comprises queries 152 against database 120 or data warehouse 122 and time schedules 154 derived from re-execution indications associated with corresponding queries. Data structure 124 may further comprise information related to queries issued against database 120 or data warehouse 122, such as query results.

Computer system 110 further comprises a network interface 140 operably connected to data bus 114. Network interface 140 is suitable to establish a network connection between computer system 110 and another computer system via a communications network 160 (as shown in FIGS. 2 and 3), preferably via the Internet.

Figure 2:
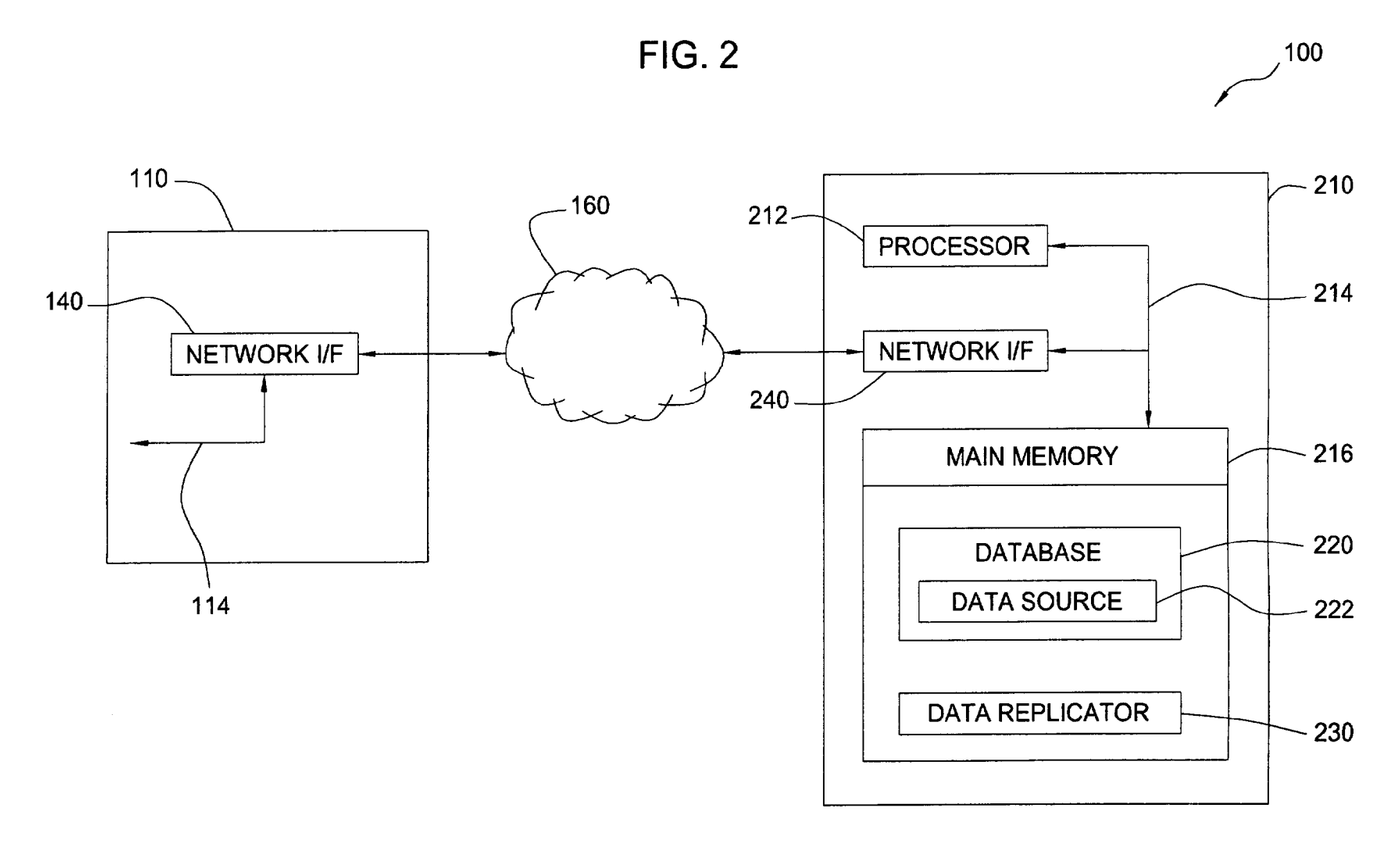

FIG. 2 shows computing environment 100 comprising computer system 110 of FIG. 1 and one further illustrative computer system 210. Computer system 110 and computer system 210 are both connected to communications network 160. Illustratively, computer system 110 comprises network interface 140 operably connected to bus 114. For the purpose of simplicity, other features of computer system 110, which have been described above with respect to FIG. 1, have been omitted in FIG. 2. Further, while only one computer system 210 is shown connected to communications network 160, it should be clear that more than one computer system 210 may be connected to communications network 160.

Computer system 210 preferably comprises a processor 212 operably connected to a network interface 240 and a main memory 216 via data bus 214. The network interface 240 is suitable to establish the communication with computer system 110 via communications network 160.

The main memory 216 is any memory sufficiently large to hold the necessary programs and data structures. Main memory 216 could be one or a combination of memory devices, including Random Access Memory, nonvolatile or backup memory, (e.g., programmable or Flash memories, read-only memories, etc.). In addition, memory 216 may be considered to include memory physically located elsewhere in computing environment 100, for example, any storage capacity used as virtual memory or stored on a mass storage device (not shown) or on another computer coupled to the computer system 210.

As shown, the main memory 216 preferably includes a database 220 for storing any type of information and, in particular, a data source 222 representing data to be loaded into the data warehouse 122 of FIG. 1. The main memory 216 may also include a data replication system 230, also referred to as data replicator, suitable to replicate data of data source 222 to the data warehouse 122. Illustratively, the data replicator is a Data Propagator available from International Business Machines Corporation of Armonk, N.Y.

Data replication system 230 may be implemented as a software program, which may be launched to replicate the data of data source 222 to data warehouse 122. The data replication system 230 may comprise a detection unit (not shown) to detect changes in the data of data source 222 and a replication unit (not shown) to replicate the data of data source 222 to data warehouse 122 when a change occurs.

In FIG. 2, data replication system 230 illustratively resides in main memory 216. However, it should be appreciated that data replication system 230 may be provided independently of main memory 216, e.g., in a specifically designed hardware component of computer system 210 or on a remote computer system that is connected with computer system 210, for example, via communications network 160. Accordingly, data replication system 230 may also reside on computer system 110 of FIG. 1.

Figure 3:
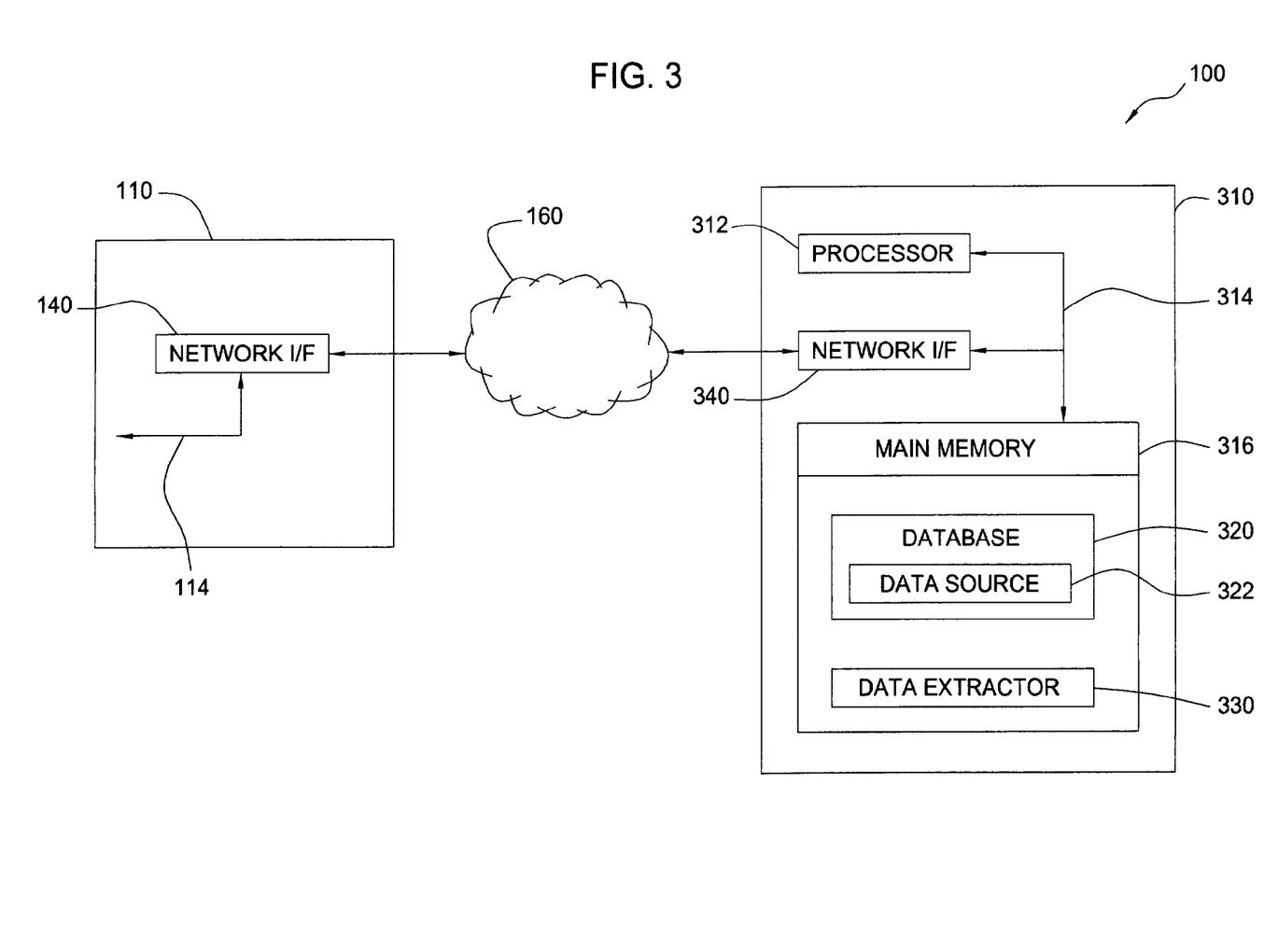

FIG. 3 shows computing environment 100 comprising computer system 110 of FIG. 1 and one further illustrative computer system 310. Computer system 110 and computer system 310 are both connected to communications network 160. Illustratively, computer system 110 comprises network interface 140 operably connected to bus 114. For the purpose of simplicity, other features of computer system 110, which have been described above with respect to FIG. 1, have been omitted in FIG. 3. Further, while only one computer system 310 is shown connected to communications network 160, it should be clear that more than one computer system 310 may be connected to communications network 160. In one embodiment, at least one computer system 110 of FIG. 1, at least one computer system 210 of FIG. 2 and a plurality of computer systems 310 are connected to communications network.

Computer system 310 preferably comprises a processor 312 operably connected to a network interface 340 and a main memory 316 via data bus 314. The network interface 340 is suitable to establish the communication with computer system 110 via communications network 160.

The main memory 316 is any memory sufficiently large to hold the necessary programs and data structures. Main memory 316 could be one or a combination of memory devices, including Random Access Memory, nonvolatile or backup memory, (e.g., programmable or Flash memories, read-only memories, etc.). In addition, memory 316 may be considered to include memory physically located elsewhere in computing environment 100, for example, any storage capacity used as virtual memory or stored on a mass storage device (not shown) or on another computer coupled to the computer system 310.

As shown, the main memory 316 preferably includes a database 320 for storing any type of information and, in particular, a data source 322 representing data to be loaded into the data warehouse 122 of FIG. 1. The main memory 216 may also include a data extraction system 330, also referred to as data extractor, suitable to extract data of data source 322 to the data warehouse 122. Illustratively, the data extractor is a DB2 Warehouse Manager available from International Business Machines Corporation of Armonk, N.Y.

Data extraction system 330 may be implemented as a software program, which may be launched to extract the data of data source 322 to data warehouse 122. The data extraction system 330 may comprise a timer (not shown) adapted to count time units and an extraction unit (not shown) to extract the data of data source 322 to data warehouse 122 dependent on the time units counted by the timer.

In FIG. 3, data extraction system 330 is illustratively resides in main memory 316. However, it should be appreciated that data extraction system 330 may be provided independently of main memory 316, e.g., in a specifically designed hardware component of computer system 310 or on a remote computer system that is connected with computer system 310, for example, via communications network 160. Accordingly, data extraction system 330 may also reside on computer system 110 of FIG. 1. Furthermore, it should be noted that any one of computer systems 110 of FIG. 1, 210 of FIG. 2 and 310 of FIG. 3 may comprises arbitrary combinations of the above described features. For instance, main memory 116 of computer system 110 of FIG. 1 may comprise data source 222 and data replication system 230 of FIG. 2 and/or data source 322 and data extraction system 330 of FIG. 3 in addition to the features described above with reference to FIG. 1.

Figure 4:
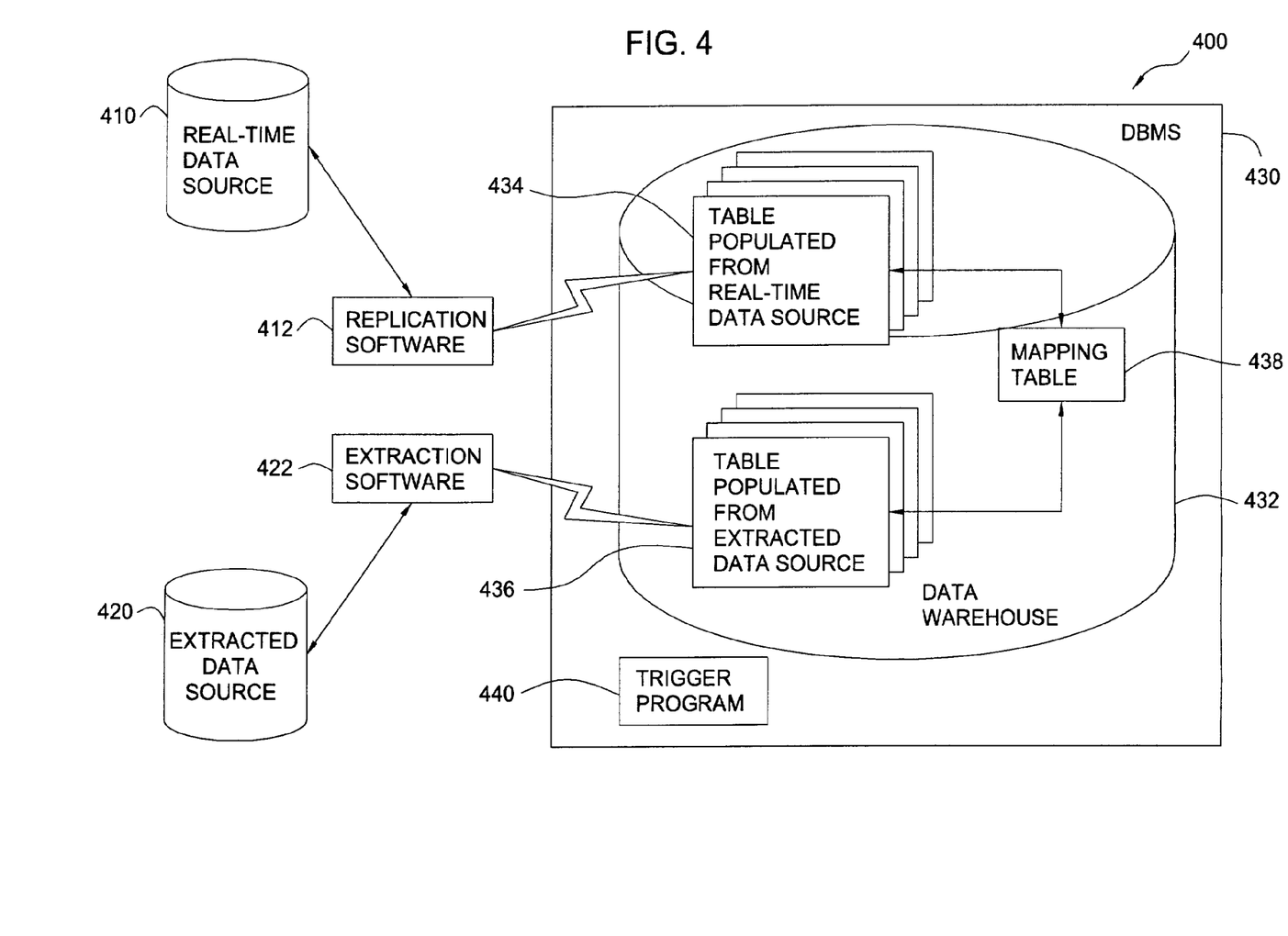
FIG. 4 is a relational view of a data management system (DMS) according to one embodiment of the invention.

FIG. 4 shows a relational view of a data management system (DMS) 400 according to one embodiment of the invention. The DMS 400 comprises a first data source 410 (e.g., data source 222 of FIG. 2), a second data source 420 (e.g., data source 322 of FIG. 3) and a database management system (DBMS) 430 (e.g., DBMS 126 of FIG. 1), which may be implemented on one or more computer systems (e.g., computer systems 110 of FIG. 1, 210 of FIG. 2 and 310 of FIG. 3).

Illustratively, the DBMS 430 comprises a data warehouse 432 (e.g., data warehouse 122 of FIG. 1) and an updating system 440. The data warehouse 432 comprises a first plurality of tables 434 comprising data loaded from the first data source 410. The first data source 410 represents a real-time data source, i.e., data from the first data source 410 is replicated to the first plurality of tables 434. The data warehouse 432 further comprises a second plurality of tables 436 comprising data loaded from the second data source 410. The second data source 420 represents an extracted data source, i.e., data from the second data source 420 is extracted to the second plurality of tables 436. The data warehouse 432 illustratively comprises a mapping table 438 for correlating the data comprised in the first plurality of tables 434 and the second plurality of tables 436. In one embodiment, the updating system 440 may be implemented as a trigger program. The trigger program may be activated when data is loaded from the first data source 410 and/or the second data source 420. The trigger program is adapted to detect changes in the loaded data and to update the mapping table 438 on the basis of the detected changes.

The DMS 400 further comprises a data replicator 412 (e.g., data replicator 230 of FIG. 2) and a data extractor 422 (e.g., data extractor 330 of FIG. 3), which may be implemented separately on different computer systems (e.g., computer systems 110 of FIG. 1, 210 of FIG. 2 and 310 of FIG. 3) or, alternatively, together on one computer system (e.g., any one of computer systems 110 of FIG. 1, 210 of FIG. 2 and 310 of FIG. 3). The data replicator 412 is implemented as replication software adapted to monitor the first data source 410 and to replicate data from the first data source 410 to the first plurality of tables 434 when a change occurs in the first data source 410. The data extractor 422 is implemented as extraction software adapted to extract data from the second data source 420 to the second plurality of tables 436 periodically.

FIGS. 5–8 show flow charts illustrating accessing data in a database (e.g., database 120 of FIG. 1) or data warehouse (e.g., data warehouse 122 of FIG. 1) in a computer system (e.g., computer system 110 of FIG. 1) by issuing a query against the database or data warehouse. The query may comprise one or more conditions and may, for example, be a SQL query, a XML query or a procedural request. For simplicity, the data source being accessed (whether a database, data warehouse or otherwise) will be referred to as a database.

Figure 5:
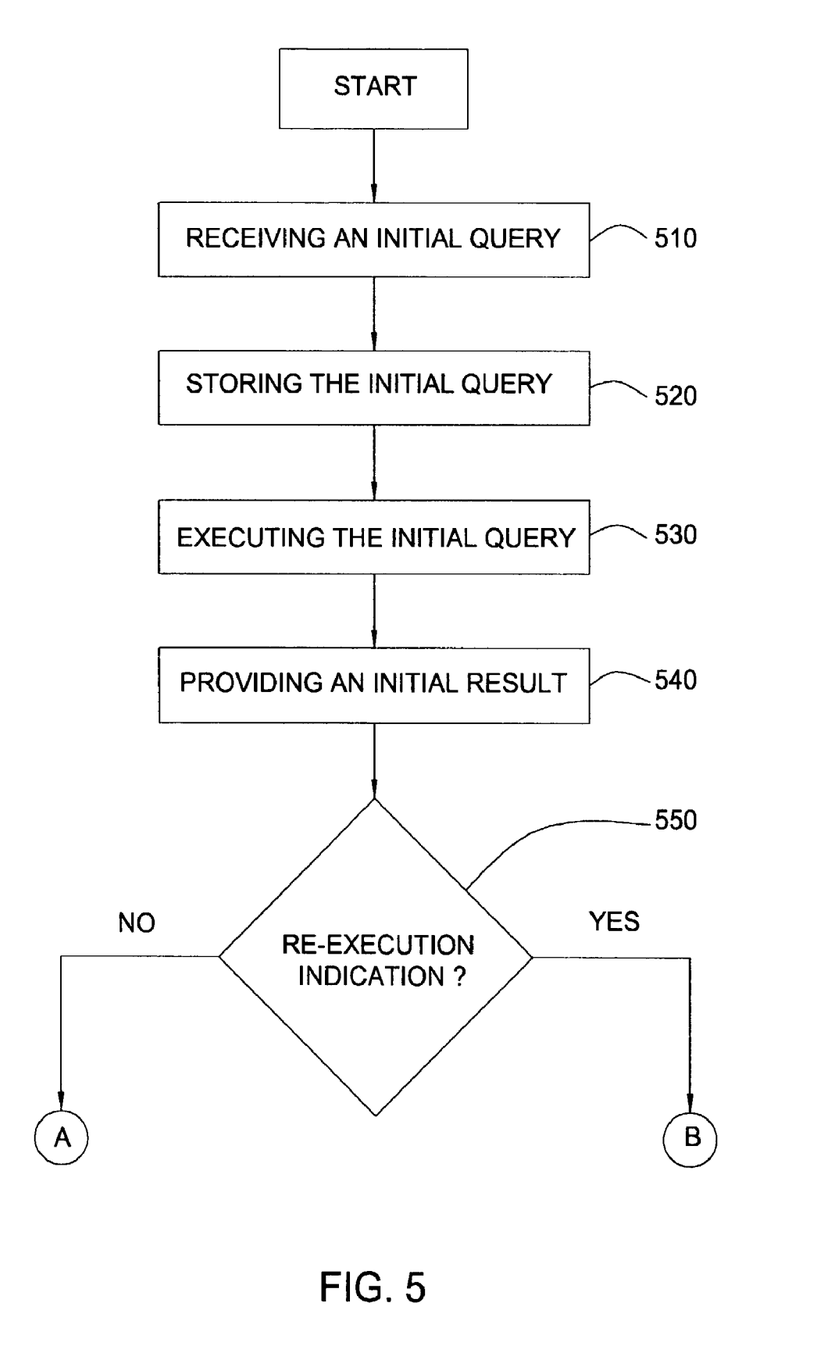
FIGS. 5, 6, 7 and 8 are flow charts illustrating accessing data in a database or data warehouse according to different aspects of the invention.

Referring now to FIG. 5, in step 510 an initial query is received in the computer system. In step 520, the received initial query is stored in a storage medium (e.g., in data structure 124 in main memory 116 of FIG. 1) of the computer system. In step 530, the stored initial query is executed and in step 540 an initial result to the executed query is provided. Providing the initial result comprises displaying the result on a display device (e.g., display 142 of FIG. 1). Alternatively, the query result may, for example, be used for subsequent processing by an application program.

In step 550, a determination is made in order to determine, whether the initial query is associated with a re-execution indication. The re-execution indication describes a desired re-execution time schedule and may be an indication of one or more specific points of time, a specific time interval or a duration of validity of the initial query. The re-execution indication may, for example, be received via a graphical user interface, which enables a user to input the initial query and the re-execution indication.

Figure 5A:
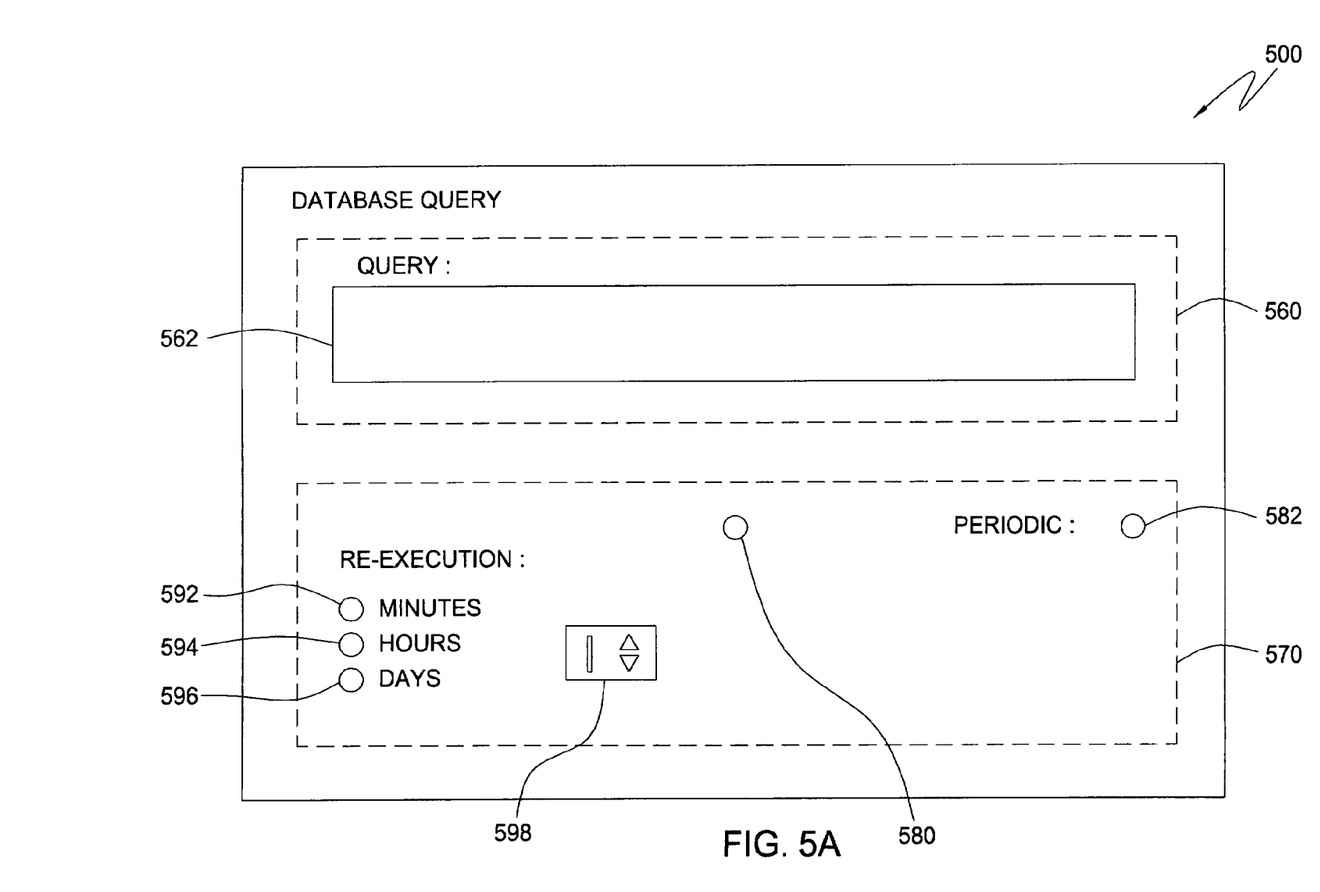
FIG. 5A illustrates a graphical user interface for entering a query associated with a re-execution indication.

FIG. 5A shows an exemplary graphical user interface 500 comprising a screen portion 560 for entering a query and a second screen portion 570 for entering a re-execution indication. Portion 560 comprises at least one field for entering the query to be executed. Portion 570 comprises at least one field for entering the re-execution indication. Illustratively, portion 570 comprises a check box 580 for indicating whether a re-execution indication should be associated with a corresponding query. Check box 582 serves to indicate whether periodic re-execution is desired. Check boxes 592, 594 and 596 are used to indicate a time indication on the basis of minutes, hours or days, respectively, entered in a field 598.

Alternatively, a tag may be associated with the initial query, the tag comprising the re-execution indication. Still alternatively, the initial query and the re-execution indication may be specified in a XML document that would be processed by a query execution application. Still alternatively, an application programming interface could be provided for another application to use, defining parameters that would represent the initial query and the re-execution indication.

Figure 6:
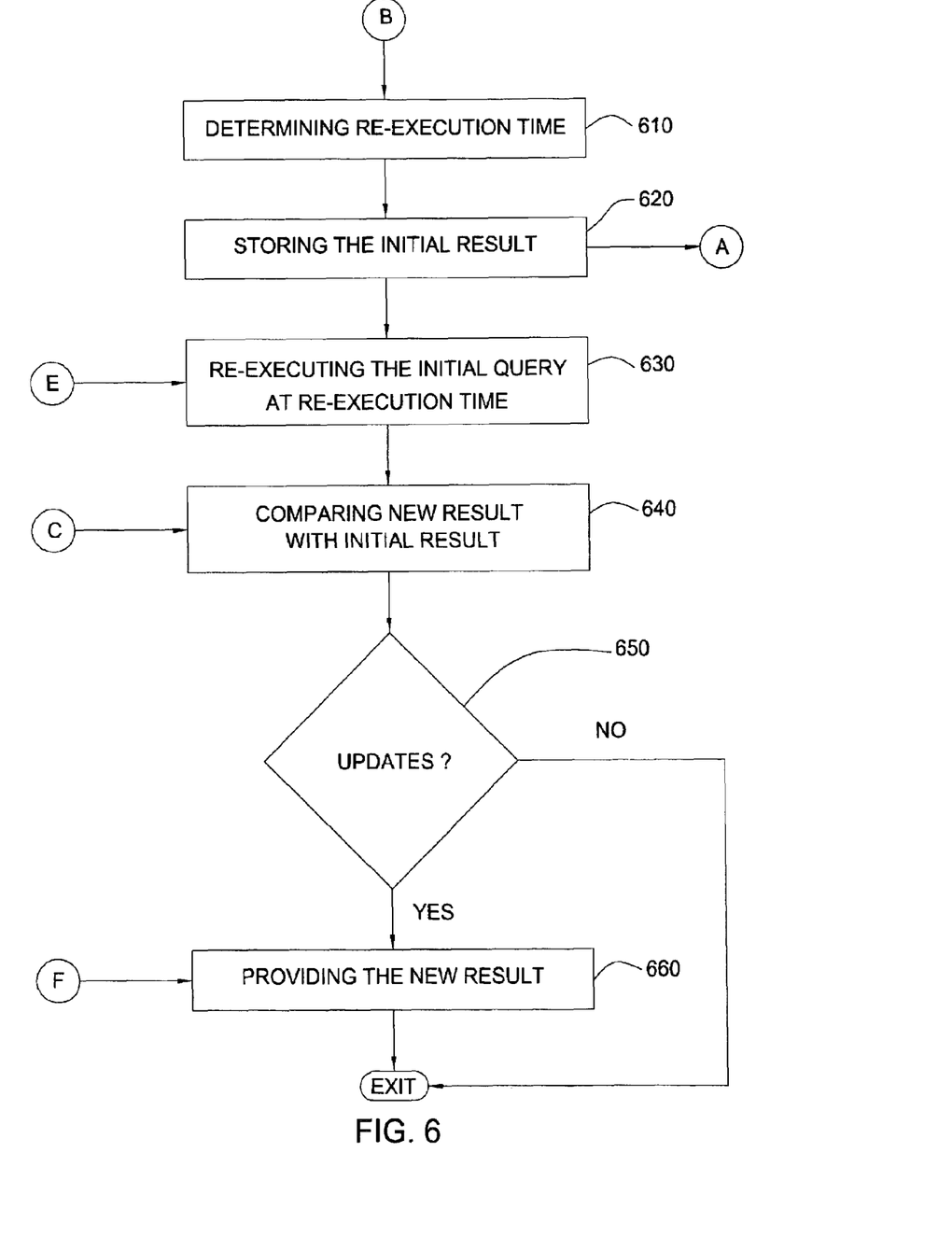

Referring now back to FIG. 5, if it is determined in step 550 that the initial query is associated with a re-execution indication, the method continues with step 610 of FIG. 6. If it is determined in step 550 that the initial query is not associated with a re-execution indication, it may be assumed that re-execution is scheduled according to a default time schedule or on a new request for execution from a user issuing the initial query, and the method continues with step 710 of FIG. 7, as described below.

Referring now to FIG. 6, in step 610 the re-execution indication associated with the initial query is accessed in order to determine a corresponding re-execution time. The determined re-execution time may be stored in the storage medium (e.g., in data structure 124 in main memory 116 of FIG. 1) of the computer system. In step 620, the initial query result may be stored in the storage medium of the computer system. In step 630 of FIG. 6, the initial query is re-executed at the determined re-execution time. In an alternative embodiment, the method may proceed from step 620 to step 710 of FIG. 7 as illustrated by the arrow leading to the symbol "A" from step 620 and as further described below. In such an embodiment, the method then returns (after completing the steps illustrated in FIG. 7) to the symbol "C" and continues with step 640.

In one embodiment, the initial query is re-executed only if the database has been modified after providing the initial query result in step 540 of FIG. 5. To determine whether the database has been modified, for instance, meta-data associated with the database may be analyzed. In the embodiment according to FIG. 4, the trigger program, i.e., updating system 440, which may be activated when data is loaded from the first data source 410 and/or the second data source 420, may be adapted to detect changes in the loaded data and to determine the updates. If a change is detected, then a trigger fires causing re-execution of the initial query. Additionally, in one embodiment, the initial query may be re-executed only against determined updates in the database. Thus, if any of the updates satisfies the initial query, a new query result may de determined and provided that comprises only records that have not been provided with the initial query result. The new query result may be displayed on a display device (e.g., display 142 of FIG. 1).

Alternatively, the initial query may be re-executed in step 630 at the determined re-execution time against the complete database to determine a new query result comprising all data records of the database, which satisfy the initial query. In step 640, the new query result may be compared with the initial result stored in step 620. In step 650, it may be determined whether the new query result comprises any data record, which has not been included in the initial result. If the new result comprises such a data record, i.e., an update, the new result is provided in step 660. Providing the new result comprises providing only the new data records, which did not occur in the initial result. If no new data records could be determined, which satisfy the initial query, or if no updates have been made within the database, a corresponding indication may be provided.

In the event that more than one re-execution time has been determined in step 610, e.g., a time interval indicating periodic re-execution times until an expiration of a validity duration, steps 630 to 660 will be repeated periodically, i.e., at each time a pre-determined re-execution time is reached. Consequently, the new query result provided in newly executed step 660 may be stored together with the initial result stored in step 620 or as a additional result.

Figure 7:
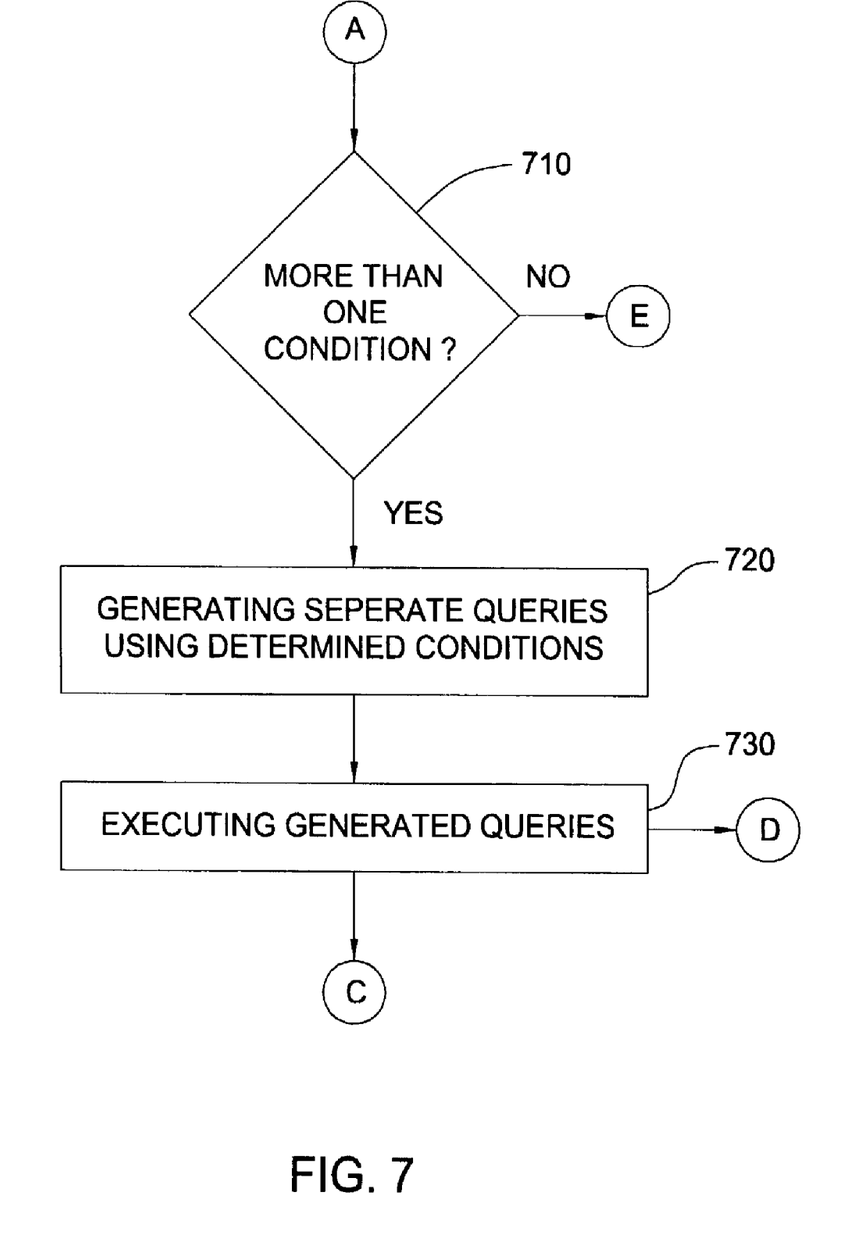

Referring now to FIG. 7, in step 710 a determination is made whether the initial query comprises more than one condition. If it is determined that the initial query does not comprise more than one condition, the method continues in step 630 of FIG. 6 as described above.

In step 720, a separate query is generated for each condition if it is determined that the initial query comprises more than one condition. To this end, the initial query is parsed, for instance, by launching one of a C, C++ or Java procedure. The conditions in the initial query are determined to break down the initial query in a series of separate conditions, for example, based on key words in the initial query. For each simple condition a corresponding query is generated. In step 730 the generated queries may be executed and the method may then proceed with step 640 of FIG. 6. Alternatively, the method may proceed with step 810 of FIG. 8.

Figure 8:
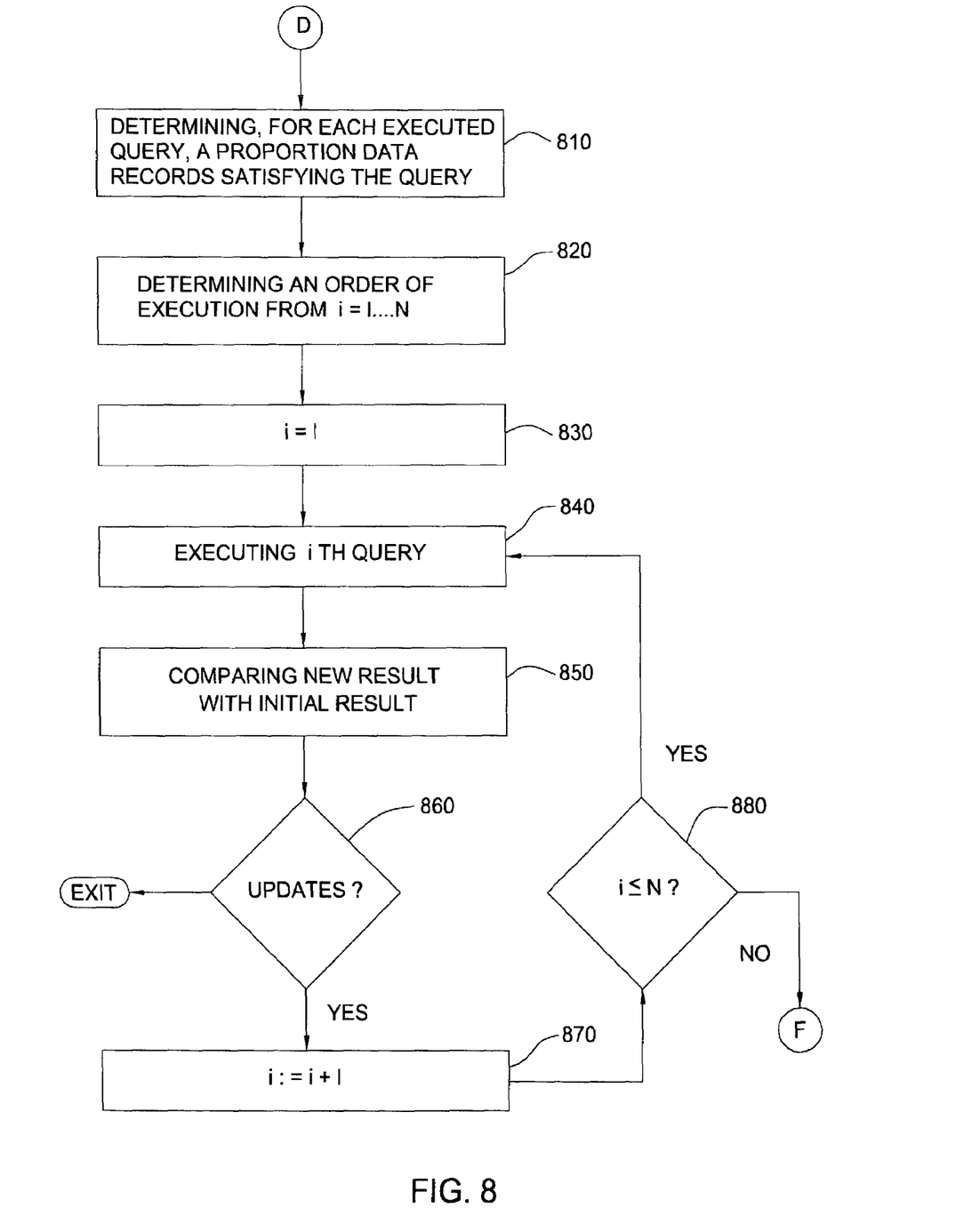

Referring now to FIG. 8, in step 810, for each of the executed separate queries, a proportion of data records in the database satisfying the query is determined. In step 820, an order of execution is determined from the determined proportions. The order of execution may be determined in the ascending or descending order. Determining the order of execution in the ascending order would allow for reducing the number of data records to be considered by executed separate queries. Assume that N separate queries have been generated in step 720 of FIG. 7, so that an order of execution i ranges from 1 to N, for example, in the ascending order of the determined proportions. In step 830, i is set to 1. In step 840, the i-th query (i.e., in the first instance, the first query) is executed. In one embodiment, this execution may be performed only if the database has been modified after providing the initial query result and only against updates in the database. Furthermore, the execution of the first query may be performed at a determined re-execution time according to the re-execution time determined in step 610 of FIG. 6.

In step 850 a new query result is provided in response to execution of the i-th query and, if the i-th query has been executed against the complete database, this new result is compared with the initial result in order to determine, whether it comprises new data records which have not occurred in the initial result. In step 860 it is determined whether there are new data records in the new result and if new data records occur, the parameter i is incremented by 1 in step 870. In step 880 it is determined whether all separate queries generated in step 720 in FIG. 7 have been executed, i.e., if the parameter i has been incremented until the value N+1. If i=N+1, all N queries have been executed and new data records occur in the determined query result, so that the method proceeds with step 660 of FIG. 6. If not all queries have been executed and new data records satisfying the preceding separate i-th query have been determined, step 840 is repeated and the incremented i-th query may be executed against the determined updates to reduce the amount of data records to be considered.

It should be appreciated that the order of the steps comprised in FIGS. 5–8 has been described for purposes of illustration. However, those skilled in the art will recognize that several of the described steps may be interchanged or omitted within the spirit and scope of the present invention. For example, the initial query result may be stored before a determination is made on whether a re-execution indication is associated with the initial query. Furthermore, the determination on whether one or more conditions are comprised in the initial query may be performed before the re-execution indication determination. Additionally, in the event that the re-execution of the initial query or the execution of the generated separate queries is performed only against updates in the database, for instance, steps 640 and 650 of FIG. 6 and step 850 of FIG. 8 may be omitted. Furthermore, it may be desirable to re-execute the initial query or the determined separate queries at pre-determined time intervals without requesting a user to enter a re-execution indication, so that steps 550 of FIG. 5 and 610 of FIG. 6 may be omitted. Furthermore, the separate queries may be determined from the initial query before the initial execution so that the corresponding proportions may be determined during the initial execution. Additionally, the determined proportions may be re-used during subsequent query executions without the need to re-compute the proportions.

In the following, the method described with respect to FIGS. 5–8 will be illustrated using SQL queries by way of example.

EXAMPLE I

Assume a database including a table "DEMOGRAPHIC" having a plurality of data records, each data record being associated with a specific person and comprising at least an indication of a last name, a result to a medical test and a gender of the specific person. Assume further that a user wants to retrieve the last names of all male persons having a value greater that 300 in the medical test, the medical test determining, for example, a number of cyclosporine metabolites. Assume further that the user wants to re-execute a corresponding query every day. To this end, the user would issue the following query against the database:

"select last_name from DEMOGRAPHIC where gender=male and cyclosporine_metabolites>300 # interval=24".

The query is executed against the database and an initial query result is provided. Furthermore, the query is analyzed to determine, if a re-execution indication is associated with the query.

In the given example, the SQL query comprises two conditions and a re-execution indication separated from the conditions by the "#" symbol. The re-execution indication is analyzed to determine a re-execution time. In the present example, the re-execution indication designates a time interval "24" specified by the key word "interval", the time interval being determined 24 hours. Accordingly, the query would be re-executed every 24 hours.

Furthermore, the initial query is analyzed to determine whether it comprises one or more conditions. In the present exemplary SQL query, conditions are indicated by the key word "where" and a parser may be used to parse the query and to determine the content of the "where" clause. The "where" clause is parsed to determine the presence of "and" and "or" operators used to separate different conditions. In the given example the "where" clause comprises two conditions separated by an "and" operator, i.e., a first condition being "gender=male" and a second condition being "cyclosporine_metabolites>300". From these two conditions, two separate queries are generated as follows:

"select last_name from DEMOGRAPHIC where gender=male"; and

"select last_name from DEMOGRAPHIC where cyclosporine_metabolites>300".

At the determined re-execution time, the generated first and second queries may be executed to determine whether new data records satisfying the initial query are in the database. To this end, the first query may be executed and the second query is only then executed, if data records satisfying the first query are determined.

Furthermore, the second query may only be executed against data records satisfying the first query.

The order of execution may be determined arbitrarily. Alternatively, a proportion of data records satisfying the first and second queries may be determined from the database. The proportions may then be used to determine an order of execution of the first and second queries.

For example, assume that 50% of all data records in the database satisfy the first query generated (i.e., the query "Select last_name from DEMOGRAPHIC where gender=male") and that only 1% of all data records in the database satisfy the second query (i.e., the query "Select last_name from DEMOGRAPHIC where cyclosporine_metabolites>300"). Accordingly, it would be more likely that a new data record entered into the database would be of gender male than have a value of cyclosporine_metabolites greater than 300. Therefore, in order to optimize query execution, it would be advisable to determine an order of execution in which the second query is executed before the first query, e.g., using a query optimizer.

Furthermore, if the second query is only executed against updates in the database and if no new data records are comprised in the updates that satisfy the second query, the first query need not to be executed. In this manner, a significant amount of processing time may be economized.

Additionally, breaking down complex queries into simple single condition queries allows performance of bundled query executions for plural initial queries. Such an embodiment will be illustrated in the following example.

EXAMPLE II

Assume a database including a table "DEMOGRAPHIC" having a plurality of data records, each data record being associated with a specific person and comprising at least an indication of a last name, a result to a medical test, a blood group indication and a gender of the specific person. Assume further that a first user wants to retrieve the last names of all persons older than 40 years and having a value greater than 300 in the medical test, the medical test determining, for example, a number of cyclosporine metabolites. Assume further that a second user wants to retrieve the last names of all male persons having a value of cyclosporine metabolites greater than 300. Assume further that a third user wants to retrieve the patient IDs of all persons (patients) having a value of cyclosporine metabolites greater than 300 and the blood group O positive. To this end, the users would issue the following queries against the database:

"Select last_name from DEMOGRAPHIC where age>40 and cyclosporine_metabolites>300"
"Select last_name from DEMOGRAPHIC where gender=male and cyclosporine_metabolites>300"
"Select patient_id from DEMOGRAPHIC where cyclosporine_metabolites>300 and blood_group=O positive".

In all three cases, a single query determining if data records with cyclosporine_metabolites>300 exist may be initially performed. If no such data record exists, in all three cases execution may be stopped.

Some of the foregoing embodiments are described with reference to data warehouses. However, it should be appreciated that the invention is not limited to use in the context of a data warehouse. Furthermore, the invention is not limited to tables comprising data records in a relational database and/or tables being replicated/extracted from data sources to tables in a data warehouse. Therefore, the described embodiments should be understood as being exemplary for purposes of illustration and are, however, not intended to limit the invention thereto. Instead, the invention is intended for use in executing a query against any type of database comprising, for example, hierarchical, networked and relational databases known in the art as well as data sources currently not known.

While the foregoing is directed to embodiments of the present invention, other and further embodiments of the invention may be devised without departing from the basic scope thereof, and the scope thereof is determined by the claims that follow.

What is claimed is:

1. A tangible computer-readable medium containing a program which, when executed on a computer system, performs an operation of accessing data in a database, the operation comprising:
   receiving a query against the database, the query being associated with a re-execution indication;
   initially executing the query;
   providing an initial query result;
   determining at least one re-execution time from the re-execution indication;
   determining, whether the database has been modified after providing the initial query result; and,
   only if the database has been modified, re-executing the query at the at least one determined re-execution time.

2. The computer-readable medium of claim 1, wherein the re-executing comprises re-executing the query against updates in the database.

3. The computer-readable medium of claim 1, wherein the database comprises a data warehouse.

4. The computer-readable medium of claim 1, wherein the re-execution indication comprises an indication of at least one specific point of time.

5. The computer-readable medium of claim 4, wherein the indication of the at least one specific point of time comprises an indication of a time interval.

6. The computer-readable medium of claim 1, wherein the re-execution indication comprises an indication of a duration of validity of the query.

7. The computer-readable medium of claim 1, wherein the initial query result comprises a plurality of data records and wherein the re-executing comprises:
   determining whether the database comprises at least one new data record satisfying the query; and
   if the database comprises at least one new data record satisfying the query:
      providing another query result comprising the at least one new data record.

8. The computer-readable medium of claim 1, wherein the query comprises a query selected from one of an SQL query, an XML query and a procedural request.

9. The computer-readable medium of claim 1, wherein the program defines a database management system performing the operation.

10. The computer-readable medium of claim 1, wherein the query comprises the re-execution indication.

11. The computer-readable medium of claim 1, wherein the operation further comprises:
    providing a graphical user interface comprising at least two fields, a first field for defining the query and a second field for defining the re-execution indication.

12. A tangible computer-readable medium containing a program which, when executed on a computer system, performs an operation of accessing data in a database, the operation comprising:
 receiving an initial query against the database, the initial query comprising a first and a second condition;
 executing the initial query;
 providing an initial query result comprising at least one first data record satisfying the initial query;
 generating a first query using the first condition that excludes the second condition, and a second query using the second condition that excludes the first condition; and
 executing the first and second queries to determine whether the database comprises at least one second data record satisfying the initial query, wherein the second record was added subsequent to the execution of the initial query.

13. The computer-readable medium of claim 12, wherein executing the first and second queries comprises executing the first and second queries only if the database has been modified after providing the initial query result.

14. The computer-readable medium of claim 12, wherein executing the first and second queries comprises, when the database is updated, executing the first and second queries in response to the updates in the database.

15. The computer-readable medium of claim 12, wherein the database comprises a data warehouse.

16. The computer-readable medium of claim 12, wherein executing the first and second queries comprises:
 executing the first query;
 determining whether the database comprises at least one new data record satisfying the first query; and
 only if the database comprises at least one new data record satisfying the first query:
  executing the second query only against the at least one new data record;
  determining whether the at least one new data record satisfies the second query; and
   if the at least one new data record satisfies the second query:
    providing another query result comprising the at least one new data record, the at least one new data record defining the at least one second data record.

17. The computer-readable medium of claim 12, wherein the initial query comprises a query selected from one of an SQL query, an XML query and a procedural request.

18. The computer-readable medium of claim 12, wherein executing the first and second queries comprises:
 executing the first query;
 providing a first query result;
 determining, using the first query result, a first proportion of data records satisfying the first condition;
 executing the second query;
 providing a second query result;
 determining, using the second query result, a second proportion of data records satisfying the second condition;
 determining, using the first and second proportions, an order of execution of the first and second queries; and
 executing the first and second queries in the determined order of execution.

19. The computer-readable medium of claim 18, wherein executing the first and second queries further comprises:
 executing one of the first and second queries according to the determined order of execution;
 determining whether the database comprises at least one new data record satisfying the executed query; and
 if the database comprises at least one new data record satisfying the executed query:
  executing the other one of the first and second queries only against the at least one new data record;
  determining whether the at least one new data record satisfies the other query; and
   if the at least one new data record satisfies the other query:
    providing another query result comprising the at least one new data record, the at least one new data record defining the at least one second data record.

20. The computer-readable medium of claim 12, wherein determining the first and second queries comprises: analyzing a structure of the initial query to determine the first and second conditions.

21. The computer-readable medium of claim 20, wherein analyzing the structure comprises: parsing the initial query.

22. The computer-readable medium of claim 12, wherein the program defines a database management system performing the operation.

23. A computer-readable medium containing a program which, when executed on a computer system, performs an operation of accessing data in a database, the operation comprising:
 receiving an initial query against the database, the initial query comprising a first and a second condition and being associated with a re-execution indication;
 executing the initial query;
 providing an initial query result comprising at least one first data record satisfying the initial query;
 generating a first query using the first condition that excludes the second condition, and a second query using the second condition that excludes the first condition;
 determining at least one re-execution time from the re-execution indication; and
 executing the first and second queries at the at least one determined re-execution time to determine whether the database comprises at least one second data record satisfying the initial query, and wherein executing the first and second queries is performed only if the database has been modified after providing the initial query result.

24. The computer-readable medium of claim 23, wherein the database comprises a data warehouse.

25. The computer-readable medium of claim 23, wherein the re-execution indication comprises an indication of at least one specific point of time.

26. The computer-readable medium of claim 25, wherein the indication of the at least one specific point of time comprises an indication of a time interval.

27. The computer-readable medium of claim 23, wherein the re-execution indication comprises an indication of a duration of validity of the query.

28. The computer-readable medium of claim 23, wherein executing the first and second queries comprises:
 executing the first query;
 determining whether the database comprises at least one new data record satisfying the first query; and
 if the database comprises at least one new data record satisfying the first query:
  executing the second query only against the at least one new data record;

determining whether the at least one new data record satisfies the second query; and
if the at least one new data record satisfies the second query:
providing another query result comprising the at least one new data record, the at least one new data record defining the at least one second data record.

29. The computer-readable medium of claim 23, wherein the initial query is selected from one of an SQL query, an XML query and a procedural request.

30. The computer-readable medium of claim 23, wherein the first and second queries comprise a SQL query, an XML query and a procedural request.

31. The computer-readable medium of claim 23, wherein executing the first and second queries comprises:
executing the first query;
providing a first query result;
determining, using the first query result, a first proportion of data records satisfying the first condition;
executing the second query;
providing a second query result;
determining, using the second query result, a second proportion of data records satisfying the second condition;
determining, using the first and second proportions, an order of execution of the first and second queries; and
executing the first and second queries in the determined order of execution.

32. The computer-readable medium of claim 31, wherein executing the first and second queries further comprises:
executing one of the first and second queries according to the determined order of execution;
determining whether the database comprises at least one new data record satisfying the executed query; and
if the database comprises at least one new data record satisfying the executed query:
executing the other one of the first and second queries only against the at least one new data record;
determining whether the at least one new data record satisfies the other query; and
if the at least one new data record satisfies the other query:
providing another query result comprising the at least one new data record, the at least one new data record defining the at least one second data record.

33. The computer-readable medium of claim 23, wherein determining the first and second queries comprises: analyzing a structure of the initial query to determine the first and second conditions.

34. The computer-readable medium of claim 33, wherein analyzing the structure comprises: parsing the initial query.

35. The computer-readable medium of claim 23, wherein the program defines a database management system performing the operation.

36. The computer-readable medium of claim 23, wherein the query comprises the re-execution indication.

37. The computer-readable medium of claim 23, wherein the operation further comprises:
providing a graphical user interface comprising at least two fields, a first field for defining the query and a second field for defining the re-execution indication.

38. A method of accessing data in a database, the method comprising:
issuing a query against the database, the query being associated with a re-execution indication;
initially executing the query;
providing an initial query result;
determining at least one re-execution time from the re-execution indication;
determining, whether the database has been modified after providing the initial query result; and,
only if the database has been modified, re-executing the query at the at least one determined re-execution time.

39. A method of accessing data in a database, the method comprising:
issuing an initial query against the database, the initial query comprising a first and a second condition;
executing the initial query;
providing an initial query result comprising at least one first data record satisfying the initial query;
generating a first query using the first condition that excludes the second condition, and a second query using the second condition that excludes the first condition; and
executing the first and second queries to determine whether the database comprises at least one second data record satisfying the initial query, wherein the second record was added subsequent to the execution of the initial query.

40. A method of accessing data in a database, the method comprising:
issuing an initial query against the database, the initial query comprising a first and a second condition and being associated with a re-execution indication;
executing the initial query;
providing an initial query result comprising at least one first data record satisfying the initial query;
generating a first query using the first condition that excludes the second condition, and a second query using the second condition that excludes the first condition;
determining, whether the database has been modified after providing the initial query result;
determining at least one re-execution time from the re-execution indication; and
executing the first and second queries at the at least one determined re-execution time to determine whether the database comprises at least one second data record satisfying the initial query.

* * * * *